US012700613B2

(12) United States Patent
Xu et al.

(10) Patent No.: US 12,700,613 B2
(45) Date of Patent: Aug. 4, 2026

(54) CORE-SHELL GRADIENT TERNARY PRECURSOR AND PREPARATION METHOD AND APPLICATION THEREOF

(71) Applicant: JINGMEN GEM CO., LTD., Jingmen (CN)

(72) Inventors: Kaihua Xu, Jingmen (CN); Xianjin Yue, Jingmen (CN); Kun Zhang, Jingmen (CN); Wenchao Hua, Jingmen (CN); Cong Li, Jingmen (CN); Xing Yang, Jingmen (CN); Hao Lv, Jingmen (CN); Wenfang Yuan, Jingmen (CN); Dongming Jia, Jingmen (CN); Xiaofei Xue, Jingmen (CN); Xueqian Li, Jingmen (CN); Liangjiao Fan, Jingmen (CN); Xing Xiang, Jingmen (CN); Xiaoshuai Zhu, Jingmen (CN); Jiamin Shi, Jingmen (CN); Zhengjie Gong, Jingmen (CN); Daodao Yin, Jingmen (CN)

(73) Assignee: JINGMEN GEM CO., LTD., Jingmen (CN)

( * ) Notice: Subject to any disclaimer, the term of this patent is extended or adjusted under 35 U.S.C. 154(b) by 113 days.

(21) Appl. No.: 18/284,452

(22) PCT Filed: Aug. 18, 2022

(86) PCT No.: PCT/CN2022/113253

§ 371 (c)(1),
(2) Date: Sep. 27, 2023

(87) PCT Pub. No.: WO2023/216453

PCT Pub. Date: Nov. 16, 2023

(65) Prior Publication Data

US 2025/0083974 A1 Mar. 13, 2025

(30) Foreign Application Priority Data

May 9, 2022 (CN) ......................... 202210501591.5

(51) Int. Cl.
*C01G 53/50* (2025.01)
*H01M 10/0525* (2010.01)

(52) U.S. Cl.
CPC ........ *C01G 53/50* (2013.01); *H01M 10/0525* (2013.01); *C01P 2004/84* (2013.01); *C01P 2006/40* (2013.01)

(58) Field of Classification Search
CPC .......................... H01M 10/0525; C01G 53/50; C01P 2006/40; C01P 2004/84
(Continued)

(56) References Cited

U.S. PATENT DOCUMENTS 11,440,811 B2 9/2022 Ma et al.
11,708,280 B2 7/2023 Xu et al.
(Continued)

FOREIGN PATENT DOCUMENTS

CN 104979104 A 10/2015
CN 107968202 A 4/2018
(Continued)

OTHER PUBLICATIONS

Mehek et al. Metal-organic framework based electrode materials for lithium-ion batteries: a review. RSC Adv. vol. 11, 2021, pp. 29247-29266. Retrieved from https://pubs.rsc.org/en/content/articlelanding/2021/ra/d1ra05073g (Year: 2021).*
(Continued)

*Primary Examiner* — James M Erwin
(74) *Attorney, Agent, or Firm* — Maschoff Brennan

(57) ABSTRACT

A core-shell gradient ternary precursor and a preparation method and application thereof. The preparation method
(Continued)

includes (1) mixing a terephthalic acid solution with alkaline liquor to obtain a terephthalic acid salt solution, adding a nickel source solution for a reaction to obtain a Ni-MOF solution, mixing the Ni-MOF solution with ammonia water, and adjusting a pH value to obtain a base solution; and (2) adding a nickel-cobalt-manganese ternary mixed salt solution, a liquid alkali solution, and an ammonia-water solution simultaneously to the base solution obtained in step (1) for a co-precipitation reaction, and obtaining the core-shell gradient ternary precursor after aging treatment. The Ni-MOF is pre-prepared and used as a core for the co-precipitation reaction, to obtain the core-shell like precursor with a gradient. Carbon in the core of the core-shell gradient ternary precursor reacts with oxygen, thereby reducing a nickel oxidation state on particle surfaces and reducing crack generation.

20 Claims, 1 Drawing Sheet

(58) Field of Classification Search
USPC .................................................... 429/231.95
See application file for complete search history.

(56) References Cited

U.S. PATENT DOCUMENTS

| | | | | |
|---|---|---|---|---|
| 2012/0049110 | A1* | 3/2012 | Trukhan | H01M 4/0471 252/182.1 |
| 2017/0317344 | A1 | 11/2017 | Tan | |
| 2021/0155649 | A1 | 5/2021 | Lang et al. | |

FOREIGN PATENT DOCUMENTS

| | | | | | |
|---|---|---|---|---|---|
| CN | 109546146 | A | * | 3/2019 | H01M 10/0525 |
| CN | 109962233 | A | | 7/2019 | |
| CN | 111129463 | A | * | 5/2020 | H01M 4/525 |
| CN | 111422926 | A | | 7/2020 | |
| CN | 111525113 | A | | 8/2020 | |
| CN | 111924894 | A | * | 11/2020 | H01M 4/505 |
| CN | 112169732 | A | | 1/2021 | |
| CN | 112608488 | A | | 4/2021 | |
| CN | 112701271 | A | | 4/2021 | |
| CN | 112993229 | A | | 6/2021 | |
| CN | 114773617 | A | | 7/2022 | |
| CN | 114773617 | B | | 9/2023 | |
| JP | 2021517719 | A | | 7/2021 | |
| WO | 2019/104473 | A1 | | 6/2019 | |

OTHER PUBLICATIONS

1st Office Action dated Aug. 11, 2025 of corresponding KR application No. 10-2023-7033346.

Lingyun Zhou et al., Functional Mesoporous Materials, Mar. 31, 2019, p. 11.

International Search Report and Written Opinion of the International Searching Authority for PCT Patent application No. PCT/CN2022/113253.

Search Report dated Nov. 11, 2024 for European patent application No. 22932482.7.

First Office Action dated Nov. 5, 2024 for JP patent application No. 2023-562476.

Second Office Action dated Apr. 1, 2025 for JP patent application No. 2023-562476.

Nickel-rich layered $LiNi_{0.8}Mn_{0.1}Co_{0.1}O_2$ with dual gradients on both primary and secondary particles in lithium-ion batteries.

Mixed-Metal Strategy on Metal-Organic Framevorks (MOFs) for Functionalities Expansion Co Substitution Induces Aerobic Oxidation of Cyclohexene over Inactive Ni-MOF-74.

Ternary MOF-Based Redox Active Sites Enabled 3D-on-2D Nanoarchitectured Battery-Type Electrodes for High-Energy-Density Supercapatteries.

Yuzhen Han, "Metal Organic Frameworks as Electrode Materials for Lithium Ion Batteries," (Dec. 2017).

CN Office Action dated Jan. 20, 2023 as received in Application No. 202210501591.5.

* cited by examiner

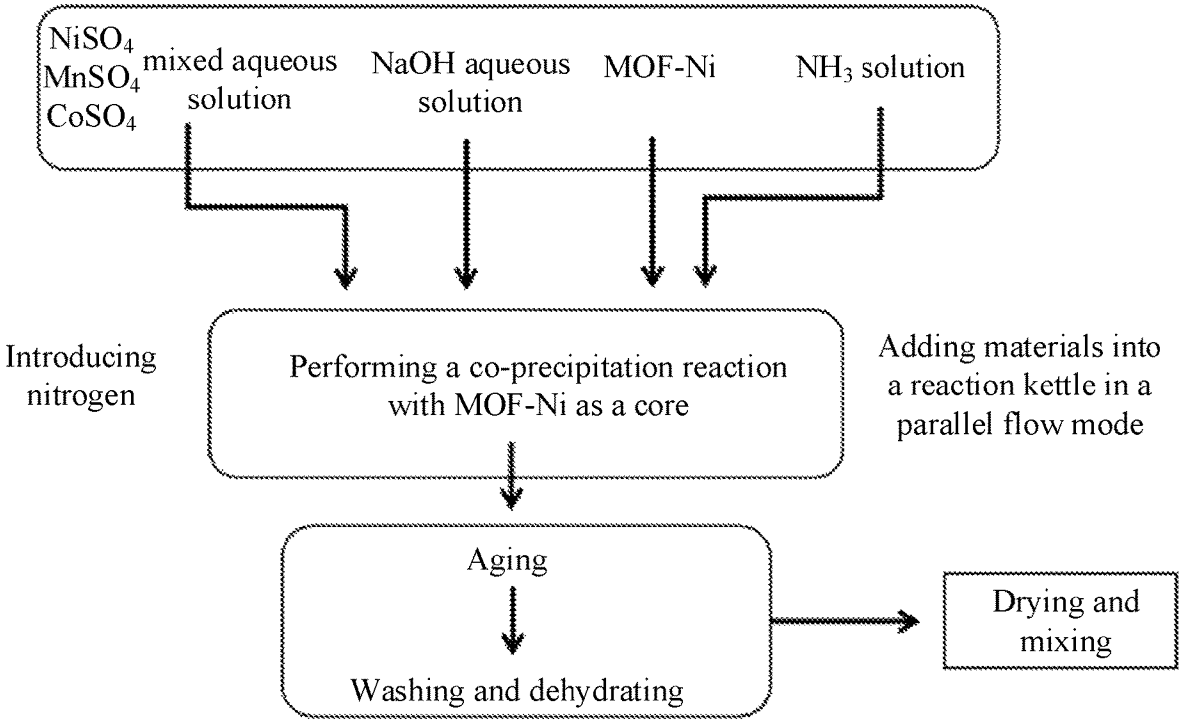
$NiSO_4$
$MnSO_4$
$CoSO_4$
mixed aqueous solution
NaOH aqueous solution
MOF-Ni
$NH_3$ solution
Introducing nitrogen
Performing a co-precipitation reaction with MOF-Ni as a core
Adding materials into a reaction kettle in a parallel flow mode
Aging
Washing and dehydrating
Drying and mixing

CORE-SHELL GRADIENT TERNARY PRECURSOR AND PREPARATION METHOD AND APPLICATION THEREOF

TECHNICAL FIELD

The present application belongs to the technical field of lithium-ion batteries, and relates to a core-shell gradient ternary precursor and a preparation method and application thereof.

BACKGROUND

In order to meet high energy demand of an electric vehicle, nickel-rich laminated materials $LiNi_{1-x-y}Mn_xCo_yO_2$ (x+y≤0.4)(NCM) and $LiNi_{0.8}Co_{0.15}Al_{0.05}O_2$ are considered the most promising positive electrode candidate materials, with a capacity of 200 mAh/g and a high voltage of 3.8 V(vsLi+/Li). However, problems such as $Li^+/Ni^{2+}$ cation mixing, Li residue, poor thermal stability, and pulverization limit cycling and rate capability of a battery. So far, scientists have attempted to improve structural stability through the use of various strategies, including element doping, surface coating, concentration gradient formation, and the like.

CN112701271A discloses an element doping method based on a ternary precursor positive electrode material, which includes steps of weighing soluble nickel salt, soluble cobalt salt, and soluble manganese salt and dissolving them in deionized water to obtain a ternary metal salt solution; and preparing an alkaline complexing agent, mixing the alkaline complexing agent with the ternary metal salt solution for a reaction, then performing collecting, filtering, washing, and drying in sequence to obtain ternary precursor powder.

CN111422926A discloses an Al/La co-doped high-nickel ternary precursor with a core-shell structure, a preparation method thereof, and a positive electrode material prepared from the above precursor. The preparation method mainly consists of three steps. The first step is to synthesize an Al-doped high-nickel ternary precursor with rod-shaped primary particles at low pH; and the second step is to increase pH based on the above, and grow an La-doped high-nickel ternary precursor shell with needle-like primary particles with the Al-doped high-nickel ternary precursor as a core, so as to synthesize the Al/La co-doped high-nickel ternary precursor with a core-shell structure.

Element doping can significantly improve cycling stability of the positive electrode material, but it also brings about a problem of capacity reduction. Although applying a protective layer on secondary particles can isolate an active material from electrolyte, it cannot prevent intergranular cracking inside primary particles caused by frequent volume changes during electrochemical cycling. As a result, accumulation strain within each primary particle causes the secondary particles to shatter. Concentration gradient is a relatively good method, but a preparation process is quite cumbersome, severely limiting its large-scale production.

SUMMARY OF THE INVENTION

The following is an overview of a subject described in detail herein. This overview is not intended to limit the scope of protection of the claims.

The present application aims to provide a core-shell gradient ternary precursor and a preparation method and application thereof. The present application pre-prepares Ni-MOF, uses Ni-MOF as a core for the co-precipitation reaction, and prepares to obtain the core-shell like precursor with a gradient. In a process of preparing a positive electrode material, carbon in the core of the core-shell gradient ternary precursor reacts with oxygen, thereby reducing a nickel oxidation state on particle surfaces and reducing generation of cracks.

To achieve the purpose of this application, the present application adopts the following technical solutions:

In a first aspect, the present application provides a method of preparing a core-shell gradient ternary precursor, and the method includes the following steps of:

(1) mixing a terephthalic acid solution with alkaline liquor to obtain a terephthalic acid salt solution, adding a nickel source solution for a reaction to obtain a Ni-MOF solution, mixing the Ni-MOF solution with ammonia water, and adjusting a pH value to obtain a base solution; and (2) adding a nickel-cobalt-manganese ternary mixed salt solution, a liquid alkali solution, and an ammonia-water solution simultaneously to the base solution obtained in step (1) for a co-precipitation reaction, and obtaining the core-shell gradient ternary precursor after aging treatment.

The present application pre-prepares Ni-MOF (a structure of the Ni-MOF is shown in formula I), and uses Ni-MOF as a core for the co-precipitation reaction to prepare a core-shell like precursor with a gradient. In a process of preparing a positive electrode material, a protective layer containing a rock salt phase is generated on a surface of the precursor, thereby resisting internal strain, suppressing further phase transformation, reducing generation of cracks, and improving cycling stability of the positive electrode material. The preparation method simplifies a production process, and is suitable for large-scale production.

Formula I

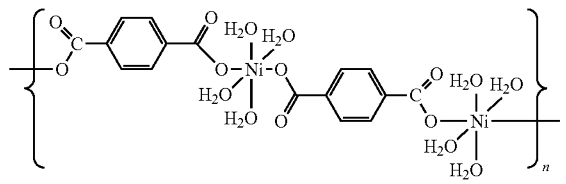

Optionally, the terephthalic acid solution in step (1) has a molar concentration of ranging from 1 mol/L to 3 mol/L, for example, 1 mol/L, 1.5 mol/L, 2 mol/L, 2.5 mol/L or 3 mol/L, etc.

Optionally, the alkaline liquor includes a potassium hydroxide solution.

Optionally, the alkaline liquor has a molar concentration of ranging from 2 mol/L to 6 mol/L, for example, 2 mol/L, 3 mol/L, 4 mol/L, 5 mol/L or 6 mol/L, etc.

Optionally, the terephthalic acid salt solution has a pH value of ranging from 6 to 7, for example, 6, 6.2, 6.5, 6.8 or 7, etc.

Optionally, the nickel source solution includes a nickel nitrate solution.

Optionally, the nickel nitrate solution has a molar concentration of ranging from 1 mol/L to 3 mol/L, for example, 1 mol/L, 1.5 mol/L, 2 mol/L, 2.5 mol/L or 3 mol/L, etc.

Optionally, a molar ratio of the terephthalic acid to the nickel element in the nickel source is 1:(0.8-1.2), for example, 1:0.8, 1:0.9, 1:1, 1:1.1 or 1:1.2, etc.

Optionally, stirring is performed in a process of the reaction in step (1).

Optionally, a stirring time is in a range from 24 h to 48 h, for example, 24 h, 30 h, 36 h, 40 h or 48 h, etc.

Optionally, filtration, washing, and drying are performed after the reaction.

Optionally, a washing agent for the washing includes anhydrous ethanol.

Optionally, the drying is performed at a temperature of ranging from 40° C. to 60° C., for example, 40° C., 45° C., 50° C., 55° C. or 60° C., etc.

Optionally, the ammonia water in the base solution in step (1) has a mass concentration of ranging from 4 g/L to 8 g/L, for example, 4 g/L, 5 g/L, 6 g/L, 7 g/L or 8 g/L, etc.

Optionally, Ni-MOF in the base solution has a mass concentration of ranging from 50 g/L to 150 g/L, for example, 50 g/L, 80 g/L, 100 g/L, 120 g/L or 150 g/L, etc.

Optionally, the base solution has a pH valve of ranging from 11 to 12, for example, 11, 11.2, 11.5, 11.8 or 12, etc.

Optionally, a solute in the nickel-cobalt-manganese ternary mixed salt solution in step (2) has a mass concentration of ranging from 80 g/L to 120 g/L, for example, 80 g/L, 90 g/L, 100 g/L, 110 g/L or 120 g/L, etc.

Optionally, the nickel-cobalt-manganese ternary mixed salt solution is added at a rate of ranging from 6 L/h to 10 L/h, for example, 6 L/h, 7 L/h, 8 L/h, 9 L/h or 10 L/h, etc.

Optionally, the liquid alkali solution has a mass concentration of ranging from 28% to 32%, for example, 28%, 29%, 30%, 31% or 32%, etc.

Optionally, the liquid alkali solution is added at a rate of ranging from 2 L/h to 3 L/h, for example, 2 L/h, 2.2 L/h, 2.5 L/h, 2.8 L/h or 3 L/h, etc.

Optionally, the ammonia-water solution has a mass concentration of ranging from 10% to 20%, for example, 10%, 12%, 15%, 18% or 20%, etc.

Optionally, the ammonia-water solution is added at a rate of ranging from 0.1 L/h to 0.6 L/h, for example, 0.1 L/h, 0.2 L/h, 0.3 L/h, 0.4 L/h, 0.5 L/h or 0.6 L/h, etc.

Optionally, the co-precipitation reaction in step (2) is carried out at a stirring rate of ranging from 200 rpm to 400 rpm, for example, 200 rpm, 250 rpm, 300 rpm, 350 rpm or 400 rpm, etc.

Optionally, the co-precipitation reaction is carried out at a pH value of ranging from 10 to 12, for example, 10, 10.5, 11, 11.5 or 12, etc.

Optionally, the co-precipitation reaction is carried out at a temperature of ranging from 40° C. to 60° C., for example, 40° C., 45° C., 50° C., 55° C. or 60° C., etc.

Optionally, a particle size is continuously monitored in the process of the co-precipitation reaction, before the particle size meets the requirements, a high-efficiency thickener is used in the process of the reaction to collect all particles and return them to a reaction kettle for continuous reaction and growth, when the particle size $D_{50}$ reaches a range from 3 μm to 4 μm (for example, 3 μm, 3.2 μm, 3.5 μm, 3.8 μm or 4 μm, etc.), feeding is stopped, and the reaction is continued until materials react completely.

In a second aspect, the present application provides a core-shell gradient ternary precursor, and the core-shell gradient ternary precursor is prepared by the method as described in the first aspect.

In a process of preparing a positive electrode material, carbon in a core of the core-shell gradient ternary precursor of the present application reacts with oxygen, thereby reducing a nickel oxidation state on particle surfaces and reducing generation of cracks.

In a third aspect, the present application provides a core-shell gradient ternary positive electrode material, and the core-shell gradient ternary positive electrode material is prepared from the core-shell gradient ternary precursor as described in the second aspect.

In a fourth aspect, the present application provides a positive electrode plate, and the positive electrode plate includes the core-shell gradient ternary positive electrode material as described in the third aspect.

In a fifth aspect, the present application provides a lithium-ion battery, and the lithium-ion battery includes a positive electrode plate as described in the fourth aspect.

Compared to the prior art, the present application has the following beneficial effects:

the present application pre-prepares Ni-MOF, uses Ni-MOF as the core for the co-precipitation reaction, and prepares to obtain the core-shell like precursor with the gradient. In the process of preparing the positive electrode material, the carbon in the core of the core-shell gradient ternary precursor reacts with the oxygen, thereby reducing the nickel oxidation state on the particle surfaces and reducing generation of the cracks.

After reading and understanding the detailed description and accompanying drawings, other aspects can be understood.

BRIEF DESCRIPTION OF THE DRAWINGS

FIG. 1 is a process flowchart of a preparation method described in Embodiment 1 of the present application.

DETAILED DESCRIPTION

The following further explains the technical solution of the present application through specific implementations. The skilled in the art should be aware that the described embodiments are only intended to assist in understanding the present application and should not be considered as specific limitations to the present application.

Embodiment 1

The present embodiment provides a core-shell gradient ternary precursor, and a method of preparing the core-shell gradient ternary precursor is as follows:

(1) 50 L of 1 mol/L terephthalic acid is added to a 200 L reaction kettle, mechanical stirring is turned on, and 50 L of 2 mol/L potassium hydroxide solution is added to convert terephthalic acid into potassium terephthalate (pH: 6 to 7); and then a 50 L of 1 mol/L nickel nitrate solution is dropwise added to a potassium terephthalate solution at a flow rate of 2 L/h, and a large amount of green precipitate is immediately generated, stirred for 36 h, filtered and washed with ethanol for three times, washed with pure water for five times, and dried at 50° C. to obtain Ni-MOF;

(2) a nickel-cobalt-manganese ternary mixed salt solution with a concentration of 100 g/L, a liquid alkali solution with a mass concentration of 30%, and an ammonia-water solution with a mass concentration of 15% are simultaneously added in a parallel flow mode at a feeding rate of 8 L/h, 2.65 L/h, and 0.8 L/h respectively into a reaction kettle containing a base solution with a temperature of 58° C., an ammonia water concentration of 8 g/L, a Ni-MOF content of 100 g/L, and a pH value of 11.8, a co-precipitation reaction is performed at a stirring rate of 380 rpm, in the process of the reaction, a pH value of a reaction system is controlled to be 11.3, the ammonia concentration is 6.5 g/L, the temperature is 58° C., and high-purity nitrogen is continuously introduced. A particle size is monitored in the process, before the particle size meets the requirements, a high-efficiency thickener is used in the process of the reaction to collect all particles and return them to the reaction kettle at any time for continuous reaction and growth, when the particle size $D_{50}$ reaches 4 μm, feeding is stopped, the reaction is continued until materials react completely, and then centrifugation, washing, and drying are performed, so as to obtain the core-shell gradient ternary precursor with Ni-MOF as the core.

A process flowchart of the preparation method is shown in FIG. 1.

Embodiment 2

The present embodiment provides a core-shell gradient ternary precursor, and a method of preparing the core-shell gradient ternary precursor is as follows:

(1) 50 L of 1.2 mol/L terephthalic acid is added to a 200 L reaction kettle, mechanical stirring is turned on, and 50 L of 2.4 mol/L of potassium hydroxide solution is added to convert terephthalic acid into potassium terephthalate (pH: 6 to 7); and then a 50 L of 1.3 mol/L nickel nitrate solution is dropwise added to a potassium terephthalate solution at a flow rate of 2 L/h, a large amount of green precipitate is immediately generated, stirred for 38 h, filtered and washed with ethanol for three times, washed with pure water for five times, and dried at 50° C. to obtain Ni-MOF;

(2) a nickel-cobalt-manganese ternary mixed salt solution with a concentration of 100 g/L, a liquid alkali solution with a mass concentration of 32%, and an ammonia-water solution with a mass concentration of 16% are simultaneously added in a parallel flow mode at a feeding rate of 8 L/h, 2.65 L/h, and 0.8 L/h respectively into a reaction kettle containing a base solution with a temperature of 58° C., an ammonia water concentration of 8 g/L, a Ni-MOF content of 100 g/L, and a PH value of 11.8, a co-precipitation reaction is performed at a stirring rate of 380 rpm, in the process of the reaction, a pH value of a reaction system is controlled to be 11.3, the ammonia concentration is 6.5 g/L, the temperature is 58° C., and high-purity nitrogen is continuously introduced. A particle size is monitored in the process, before the particle size meets the requirements, a high-efficiency thickener is used in the process of the reaction to collect all particles and return them to the reaction kettle at any time for continuous reaction and growth, when the particle size $D_{50}$ reaches 3.5 μm, feeding is stopped, the reaction is continued until materials react completely, and then centrifugation, washing, and drying are performed, so as to obtain the core-shell gradient ternary precursor with Ni-MOF as the core.

Embodiment 3

The only difference between the present embodiment and Embodiment 1 is that a concentration of nickel nitrate is 0.6 mol/L, and other conditions and parameters are completely the same as those of Embodiment 1.

Embodiment 4

The only difference between the present embodiment and Embodiment 1 is that a concentration of nickel nitrate is 1.5 mol/L, and other conditions and parameters are completely the same as those of Embodiment 1.

Embodiment 5

The only difference between the present embodiment and Embodiment 1 is that the pH value in the process of the reaction is controlled to be 9, and other conditions and parameters are completely the same as those of Embodiment 1.

Embodiment 6

The only difference between the present embodiment and Embodiment 1 is that the pH value in the process of the reaction is controlled to be 12, and other conditions and parameters are completely the same as those of Embodiment 1.

Embodiment 7

The only difference between the present embodiment and Embodiment 1 is that a particle size of the precursor is 2.5 μm, and other conditions and parameters are completely the same as those of Embodiment 1.

Embodiment 8

The only difference between the present embodiment and Embodiment 1 is that a particle size of the precursor is 4.5 μm, and other conditions and parameters are completely the same as those of Embodiment 1.

Comparative Example 1

The only difference between the present comparative example and Embodiment 1 is that Ni-MOF is replaced with carbon microspheres, and other conditions are completely the same as those of Embodiment 1.

Performance Test:

After mixing the precursor obtained from Embodiments 1 to 8 and comparative example 1 with a lithium source LiOH, the resulting sample is calcined under pure oxygen protection at 800° C. for 16 hours. In a high-temperature calcination process, Ni-MOF-74 carbonizes and reacts with the precursor to form the final NMC811. The positive electrode material, a conductive agent Super P (conductive carbon black) and an adhesive PVDF (polyvinylidene fluoride) are prepared in a ratio of 90:5:5 into slurry, the slurry is evenly coated on an aluminum foil collector, baked in an 80° C. oven for 12 h, and taken out to be cut into a positive electrode plate with a diameter of 12 mm. A negative electrode adopts metal lithium foil with a diameter of 18 mm and a thickness of 1 mm, a separator adopts a Celgard polyethylene porous film, and an electrolyte solution uses an equal-amount mixture of ethylene carbonate (EC) and diethyl carbonate (DEC) with $LiPF_6$ (lithium iron phosphate) with a concentration of 1 mol/L as an electrolyte. The positive electrode, the negative electrode, the separator, and the electrolyte solution are assembled into a 2032 button type battery in a glove box with a water content and oxygen content below 0.1 ppm. After placing the battery for 12 h, a performance test is performed. Test results are shown in Table 1:

TABLE 1

| | 0.1 C Initial discharge specific capacity (mAh/g) | 1 C Initial discharge specific capacity (mAh/g) | 1 C 100 th-cycle discharge specific capacity (mAh/g) | Capacity retention rate for 100 cycles of 1 C (%) |
|---|---|---|---|---|
| Embodiment 1 | 202.7 | 183.2 | 181.4 | 99 |
| Embodiment 2 | 200.2 | 182.7 | 180.2 | 98.6 |
| Embodiment 3 | 195.4 | 173.4 | 169.6 | 97.8 |
| Embodiment 4 | 196.6 | 175.4 | 170.4 | 97.1 |
| Embodiment 5 | 193.6 | 172.4 | 169.4 | 98.3 |
| Embodiment 6 | 191.4 | 170 | 164.7 | 96.8 |
| Embodiment 7 | 190.2 | 171.7 | 167.2 | 97.3 |
| Embodiment 8 | 194.5 | 172.9 | 170.3 | 98.5 |
| Comparative Example 1 | 188.4 | 168.2 | 162.7 | 96.7 |

From Table 1, it can be seen from Embodiments 1 to 8 that after the precursor of the present application is made into a battery, the 0.1C initial discharge specific capacity can reach above 190.2 mAh/g, the 1C initial discharge specific capacity can reach above 170 mAh/g, the 1C 100th-cycle discharge specific capacity can reach above 164.7 mAh/g, and the capacity retention rate for 100 cycles of 1C can reach above 96.8%.

From the comparison between Embodiment 1 and Embodiments 3 to 4, it can be seen that a molar ratio of nickel to terephthalic acid in the preparation process of Ni-MOF will affect the quality of the prepared Ni-MOF, thereby affecting the performance of the prepared precursor. The molar ratio of the nickel to the terephthalic acid is controlled between 0.8 and 1.2:1, so that the prepared Ni-MOF has the better quality and is more suitable as the core for preparing the core-shell gradient ternary precursor.

From the comparison between Embodiment 1 and Embodiments 5 to 6, it can be seen that the pH value of the base solution affects the quality of the prepared core-shell gradient ternary precursor, controlling the pH value in the process of the reaction between 10.5 and 11.5 results in better quality of the prepared core-shell gradient ternary precursor. If the pH value is too high in the process of the reaction, it will cause too many small particles of the prepared ternary precursor, all of which are nuclei and do not grow into large spheres. If the pH value is too low in the process of the reaction, primary particles of the prepared ternary precursor will be particularly coarse, and unable to form regular spheres.

From the comparison between Embodiment 1 and Embodiments 7 to 8, it can be seen that the particle size of the core-shell gradient ternary precursor will affect the performance of the prepared core-shell gradient ternary material, and controlling the particle size of the core-shell gradient ternary precursor between 3 μm and 4 μm will result in better performance of the prepared core-shell gradient ternary material. If the particle size of the core-shell gradient ternary precursor is too large, cracks will be generated, and secondly, an electrochemical specific surface area will be very small, which affects the performance of the positive electrode material. If the particle size of the core-shell gradient ternary precursor is too small, the positive electrode material prepared by the precursor cannot form a stable Li diffusion channel, which will reduce the initial charge and discharge capacity of the positive electrode material.

From the comparison between Embodiment 1 and comparative example 1, it can be seen that the present application uses Ni-MOF as the core for the co-precipitation reaction to prepare the core-shell like precursor with the gradient. In a process of preparing a positive electrode material, a protective layer containing a rock salt phase is generated on a surface of the precursor, thereby resisting internal strain, suppressing further phase transformation, reducing generation of cracks, and improving cycling stability of the positive electrode material.

The applicant declares that the above is only the specific implementation of the present application, but the scope of protection of the present application is not limited to this. Those skilled in the art should understand that any changes or replacements that can be easily thought of by those skilled in the art within the technical scope disclosed in the present application fall within the scopes of protection and disclosure of the present application.

The invention claimed is:

1. A method of preparing a core-shell gradient ternary precursor, wherein the method comprises the following steps of:

(1) mixing a terephthalic acid solution with alkaline liquor to obtain a terephthalic acid salt solution, adding a nickel source solution for a reaction to obtain a Ni-MOF solution, mixing the Ni-MOF solution with ammonia water, and adjusting pH value to obtain a base solution; and (2) adding a nickel-cobalt-manganese ternary mixed salt solution, a liquid alkali solution, and an ammonia-water solution simultaneously to the base solution obtained in step (1) for a co-precipitation reaction, and obtaining the core-shell gradient ternary precursor after aging treatment.

2. The method of claim 1, wherein:

the terephthalic acid solution in step (1) has a molar concentration of ranging from 1 mol/L to 3 mol/L;

optionally, the alkaline liquor comprises a potassium hydroxide solution;

optionally, the alkaline liquor has a molar concentration of ranging from 2 mol/L to 6 mol/L;

optionally, the terephthalic acid salt solution has a pH value of ranging from 6 to 7;

optionally, the nickel source solution comprises a nickel nitrate solution;

optionally, the nickel nitrate solution has a molar concentration of ranging from 1 mol/L to 3 mol/L; and optionally, a molar ratio of the terephthalic acid to the nickel element in the nickel source is 1:(0.8-1.2).

3. The method of claim 1, wherein;

stirring is performed in a process of the reaction in step (1);

optionally, a stirring time is in a range from 24 h to 48 h;

optionally, filtration, washing, and drying are performed after the reaction;

optionally, a washing agent for the washing comprises anhydrous ethanol; and optionally, the drying is performed at a temperature of ranging from 40° C. to 60° C.

4. The method of claim 1, wherein:

the ammonia water in the base solution in step (1) has a mass concentration of ranging from 4 g/L to 8 g/L;

optionally, Ni-MOF in the base solution has a mass concentration of ranging from 50 g/L to 150 g/L; and optionally, the base solution has a pH valve of ranging from 11 to 12.

5. The method of claim 1, wherein:

a solute in the nickel-cobalt-manganese ternary mixed salt solution in step (2) has a mass concentration of ranging from 80 g/L to 120 g/L;

optionally, the nickel-cobalt-manganese ternary mixed salt solution is added at a rate of ranging from 6 L/h to 10 L/h;

optionally, the liquid alkali solution has a mass concentration of ranging from 28% to 32%;

optionally, the liquid alkali solution is added at a rate of ranging from 2 L/h to 3 L/h;

optionally, the ammonia-water solution has a mass concentration of ranging from 10% to 20%; and optionally, the ammonia-water solution is added at a rate of ranging from 0.1 L/h to 0.6 L/h.

6. The method of claim 1, wherein:

the co-precipitation reaction in step (2) is carried out at a stirring rate of ranging from 200 rpm to 400 rpm;

optionally, the co-precipitation reaction is carried out at a pH value of ranging from 10 to 12;

optionally, the co-precipitation reaction is carried out at a temperature of ranging from 40° C. to 60° C.; and optionally, a particle size is continuously monitored in the process of the co-precipitation reaction, before the particle size meets the requirements, a high-efficiency thickener is used in the process of the reaction to collect all particles and return them to a reaction kettle for continuous reaction and growth, when the particle size $D_{50}$ reaches a range from 3 μm to 4 μm, feeding is stopped, and the reaction is continued until materials react completely.

7. A core-shell gradient ternary precursor, wherein the core-shell gradient ternary precursor is prepared by the method of claim 1.

8. A core-shell gradient ternary positive electrode material, wherein the core-shell gradient ternary positive electrode material is prepared from the core-shell gradient ternary precursor of claim 7.

9. A positive electrode plate, comprising the core-shell gradient ternary positive electrode material of claim 8.

10. A lithium-ion battery, comprising the positive electrode plate of claim 9.

11. The method of claim 2, wherein:

stirring is performed in a process of the reaction in step (1);

optionally, a stirring time is in a range from 24 h to 48 h;

optionally, filtration, washing, and drying are performed after the reaction;

optionally, a washing agent for the washing comprises anhydrous ethanol; and optionally, the drying is performed at a temperature of ranging from 40° C. to 60° C.

12. The method of claim 2, wherein:

the ammonia water in the base solution in step (1) has a mass concentration of ranging from 4 g/L to 8 g/L;

optionally, Ni-MOF in the base solution has a mass concentration of ranging from 50 g/L to 150 g/L; and optionally, the base solution has a pH valve of ranging from 11 to 12.

13. The method of claim 3, wherein:

the ammonia water in the base solution in step (1) has a mass concentration of ranging from 4 g/L to 8 g/L;

optionally, Ni-MOF in the base solution has a mass concentration of ranging from 50 g/L to 150 g/L; and optionally, the base solution has a pH valve of ranging from 11 to 12.

14. The method of claim 2, wherein:

a solute in the nickel-cobalt-manganese ternary mixed salt solution in step (2) has a mass concentration of ranging from 80 g/L to 120 g/L;

optionally, the nickel-cobalt-manganese ternary mixed salt solution is added at a rate of ranging from 6 L/h to 10 L/h;

optionally, the liquid alkali solution has a mass concentration of ranging from 28% to 32%;

optionally, the liquid alkali solution is added at a rate of ranging from 2 L/h to 3 L/h;

optionally, the ammonia-water solution has a mass concentration of ranging from 10% to 20%; and optionally, the ammonia-water solution is added at a rate of ranging from 0.1 L/h to 0.6 L/h.

15. The method of claim 3, wherein:

a solute in the nickel-cobalt-manganese ternary mixed salt solution in step (2) has a mass concentration of ranging from 80 g/L to 120 g/L;

optionally, the nickel-cobalt-manganese ternary mixed salt solution is added at a rate of ranging from 6 L/h to 10 L/h;

optionally, the liquid alkali solution has a mass concentration of ranging from 28% to 32%;

optionally, the liquid alkali solution is added at a rate of ranging from 2 L/h to 3 L/h;

optionally, the ammonia-water solution has a mass concentration of ranging from 10% to 20%; and optionally, the ammonia-water solution is added at a rate of ranging from 0.1 L/h to 0.6 L/h.

16. The method of claim 4, wherein a:

solute in the nickel-cobalt-manganese ternary mixed salt solution in step (2) has a mass concentration of ranging from 80 g/L to 120 g/L;

optionally, the nickel-cobalt-manganese ternary mixed salt solution is added at a rate of ranging from 6 L/h to 10 L/h;

optionally, the liquid alkali solution has a mass concentration of ranging from 28% to 32%;

optionally, the liquid alkali solution is added at a rate of ranging from 2 L/h to 3 L/h;

optionally, the ammonia-water solution has a mass concentration of ranging from 10% to 20%; and optionally, the ammonia-water solution is added at a rate of ranging from 0.1 L/h to 0.6 L/h.

17. The method of claim 2, wherein:

the co-precipitation reaction in step (2) is carried out at a stirring rate of ranging from 200 rpm to 400 rpm;

optionally, the co-precipitation reaction is carried out at a pH value of ranging from 10 to 12;

optionally, the co-precipitation reaction is carried out at a temperature of ranging from 40° C. to 60° C.; and optionally, a particle size is continuously monitored in the process of the co-precipitation reaction, before the particle size meets the requirements, a high-efficiency thickener is used in the process of the reaction to collect all particles and return them to a reaction kettle for continuous reaction and growth, when the particle size $D_{50}$ reaches a range from 3 μm to 4 μm, feeding is stopped, and the reaction is continued until materials react completely.

18. The method of claim 3, wherein:

the co-precipitation reaction in step (2) is carried out at a stirring rate of ranging from 200 rpm to 400 rpm;

optionally, the co-precipitation reaction is carried out at a pH value of ranging from 10 to 12;

optionally, the co-precipitation reaction is carried out at a temperature of ranging from 40° C. to 60° C.; and optionally, a particle size is continuously monitored in the process of the co-precipitation reaction, before the particle size meets the requirements, a high-efficiency thickener is used in the process of the reaction to collect all particles and return them to a reaction kettle for continuous reaction and growth, when the particle size $D_{50}$ reaches a range from 3 μm to 4 μm, feeding is stopped, and the reaction is continued until materials react completely.

19. The method of claim 4, wherein:

the co-precipitation reaction in step (2) is carried out at a stirring rate of ranging from 200 rpm to 400 rpm;

optionally, the co-precipitation reaction is carried out at a pH value of ranging from 10 to 12;

optionally, the co-precipitation reaction is carried out at a temperature of ranging from 40° C. to 60° C.; and optionally, a particle size is continuously monitored in the process of the co-precipitation reaction, before the particle size meets the requirements, a high-efficiency thickener is used in the process of the reaction to collect all particles and return them to a reaction kettle for continuous reaction and growth, when the particle size $D_{50}$ reaches a range from 3 μm to 4 μm, feeding is stopped, and the reaction is continued until materials react completely.

20. The method of claim 5, wherein:

the co-precipitation reaction in step (2) is carried out at a stirring rate of ranging from 200 rpm to 400 rpm;

optionally, the co-precipitation reaction is carried out at a pH value of ranging from 10 to 12;

optionally, the co-precipitation reaction is carried out at a temperature of ranging from 40° C. to 60° C.; and optionally, a particle size is continuously monitored in the process of the co-precipitation reaction, before the particle size meets the requirements, a high-efficiency thickener is used in the process of the reaction to collect all particles and return them to a reaction kettle for continuous reaction and growth, when the particle size $D_{50}$ reaches a range from 3 μm to 4 μm, feeding is stopped, and the reaction is continued until materials react completely.

* * * * *